United States Patent [19]

Hacker

[11] Patent Number: 4,467,328

[45] Date of Patent: Aug. 21, 1984

[54] RADAR JAMMER WITH AN ANTENNA ARRAY OF PSEUDO-RANDOMLY SPACED RADIATING ELEMENTS

[75] Inventor: Philip S. Hacker, Silver Spring, Md.

[73] Assignee: Westinghouse Electric Corp., Pittsburgh, Pa.

[21] Appl. No.: 314,922

[22] Filed: Oct. 26, 1981

[51] Int. Cl.³ .............................................. G01S 7/36
[52] U.S. Cl. .................................. 343/18 E; 343/368; 343/844
[58] Field of Search ................. 343/18 E, 371, 368, 343/844

[56] References Cited

U.S. PATENT DOCUMENTS

| | | | |
|---|---|---|---|
| 3,859,661 | 1/1975 | Ruvin et al. | 343/16 M |
| 3,879,732 | 4/1975 | Simpson | 343/18 E |
| 4,394,659 | 7/1983 | Gellekink | 343/16 M |

FOREIGN PATENT DOCUMENTS 870916  6/1961  United Kingdom ................ 343/854

Primary Examiner—Maynard R. Wilbur
Assistant Examiner—M. R. Gordon
Attorney, Agent, or Firm—W. E. Zitelli

[57] ABSTRACT

Disclosed herein is a radar jammer which utilizes an electronically agile, sparsely populated, phase controlled antenna array of pseudo-randomly spaced radiating elements to form a high gain, single narrow beam of radiation directed at a detected threat radar, but containing only a small fraction of the available transmitting power, while providing simultaneously therewith effective jamming radiation over a wide coverage region. Preferably, the plurality of radiating elements are sparsely disposed pseudo-randomly over an area surface to form an antenna array, the number of radiating elements in the array being less than the value of the surface area divided by the transmitting carrier wavelength ($\lambda$) squared.

5 Claims, 6 Drawing Figures

4,467,328

RADAR JAMMER WITH AN ANTENNA ARRAY OF PSEUDO-RANDOMLY SPACED RADIATING ELEMENTS

BACKGROUND OF THE INVENTION

The present invention is related to an ECM system adapted for jamming threat radars, in general, and more particularly, to a radar jammer which utilizes an electronically agile, sparsely populated, phase controlled antenna array of pseudo-randomly spaced radiating elements to form a high gain, single narrow beam of radiation directed at a detected threat radar, but containing only a small fraction of the available tansmitting power, while providing simultaneously therewith effective jamming radiation over a wide coverage region.

Some ECM radar jammers, particularly those adapted for use on airborne vehicles, like missiles or airplanes, for example, have severe equipment weight restrictions imposed on the power supplies thereof. Consequently, the available jamming power for transmission is adversely limited and as a result, must be used most effectively. In most cases, airborne radar jammers are required to cover large threat volumes of space which may be on the order of ±60° azimuth and 30° elevation. The range of coverage in connection with those volumes is usually dependent on the power generation of the jammer. In order to defeat most of the threat radars encountered in a coverage region, large values of effective radiated power (ERP) are required. This effective radiated power is commonly derived as the product of the transmitted power and antenna gain. Since, for airborne radar jammers, for example, the available transmission power is limited, the required levels of ERP cannot be achieved simultaneously over the entire coverage region in most cases.

If only a single threat is encountered at any time in the threat volume, the ERP of the radar jammer may be increased effectively by using a high gain antenna for forming and aiming a relatively narrow beam directly at the threat. However, it is not prudent in most scenarios to transmit all jamming power into narrow volumes of the coverage region where known threats are detected mainly because this action leaves the aircraft vulnerable to threats which may reside in other portions of the coverage region.

In a multiple threat environment, some ECM systems have proposed to sequentially aim a narrow beam at each threat, or form multiple narrow beams with the available transmitting power beam shared therebetween or distribute equally the available transmitting power over the entire coverage region. In the first case, the need for rapidly re-aiming the formed narrow beam usually requires great agility of an electronically controlled phased array and little simultaneous defeat coverage is anticipated. The second case requires a very complex electronically controlled phased array which has the capability to alter radiating element amplitudes as well as phase, however, this case suffers from a reduction of ERP in each formed beam by a factor equal to or greater than the multiplicity of beams simultaneously formed. In the third case, no enhancement of the ERP by the antenna gain is expected. All of these proposed schemes thus far represent less than optimum utilization of the available jamming power because only a very small amount of transmitted energy illuminates the threat radar antenna detected in the coverage region with the remaining transmitted energy being lost to empty space.

Typically, airborne radar jammers are designed to form a relatively narrow jamming beam of radiation with an electronically phase controlled uniformly spaced array of radiating elements. A block diagram schematic of a typical embodiment for application as an airborne radar jammer is shown in FIG. 1. Generally, an array of antenna elements . . . , a1, a2, . . . , a5, . . . is disposed on a planar antenna section 10 with a uniform spacing s between each element of the array. Coupled to each antenna element may be a conventional phase shifter denoted by the blocks labeled P.S. The radiation power may be developed in a jamming transmitter 12 and provided to a conventional power divider unit 14 which distributes the available radiating power to the individual phase shifters. In addition, a phase shift controller 16 may provide a signal to each phase shifter of the antenna array to govern the phase shifting operation occurring therein.

In operation, power developed in the jammer transmitter 12 is passed along to the power divider 14 wherein it is distributed to the antenna elements a1, a2, . . . a5 via corresponding phase shifters P.S. The phase shift controller 16 may govern the phase shifters to form and direct a beam of radiation in a direction 20 preferably towards a detected radar threat for jamming purposes by providing a phase shift signal PS1-PS5 to each phase shift circuit individually to cause corresponding delays d1, d2, . . . , d5 in the radiated energy produced by the radiating elements coupled thereto. A phase front, denoted by the dashed line 22, is rendered by the phase controlled energy radiation pattern, which in turn forms a narrow beam 24 perpendicular to the uniform phase contour 22 and in the preferred direction 20. With the uniform spacing s between the radiating elements, the width and strength of the formed beam 24 are primarily dependent on the spacing and number of radiating elements, respectively, in the antenna array 10.

The graph depicted in FIG. 2 illustrates a typical radiation pattern along the azimuth angle of the antenna resulting from uniformly spaced radiating elements. The isotropic power level, denoted by the dashed line at 0 dB power, represents the uniform radiation pattern of the antenna (i.e. without formation of a narrow beam). In the example illustrated by the graph of FIG. 2, a radiating beam is formed in the azimuth angular direction of approximately 23° with a peak power level with respect to the isotropic level of approximately 15 dB. Note that the power radiation spectrum outside of the main beam pattern has been reduced substantially in most cases on the order of 5 to 7 dB's from that of the isotropic level. Undesirably then, there appears to be not much energy distributed anywhere but in the main beam pattern formed by the uniformly spaced radiating element array. Evidently, any energy not intercepted by the threat radar in the formed beam may be considered as wasted energy.

It has been proposed that if the beam width could be made narrower, not as much energy would be required and the threat radar could still be satisfactorily defeated assuming directive accuracy. Theoretically, to accomplish the results of a narrower beam all that need be done is to increase the uniform spacings between the radiating elements. However, as the spacings of the radiating elements are made greater, additional beams will also be formed around the desired beam 24 as illustrated by the dashed line patterns 25, 26, 27 and 28 in the schematic of FIG. 1. Of course, the energy radiated in the auxiliary beams is considered without purpose and as a result wasted. Accordingly, the extent of wasted energy in this case may be as much energy as there are in the other undesirably formed radiated beams. Thus, by making the spacing between the radiating elements of the antenna array broader, a narrower beam is achieved with less energy content, but in reality nothing appears to have been gained because what energy was saved by narrowing the beam size apparently is going off into spuriously formed beams with no purpose.

SUMMARY OF THE INVENTION

The present invention is directed to radar jamming apparatus having a limited amount of available transmitting power for distribution over a predetermined coverage region for jamming radar threats residing therein. In accordance with the present invention, a radar jammer transmitting system provides radiation over the predetermined coverage region with the available transmitting power and comprises a plurality of radiating elements spaced apart pseudo-randomly to form a radiating antenna, a jammer transmitter for developing a transmitting power signal at a desired carrier frequency from the limited amount of available transmitting power, a power divider network for distributing the developed power signal to each of the elements of the radiating antenna, and a plurality of phase shifters correspondingly coupled to the plurality of radiating elements, each phase shifter being operative to control the phase of the transmitting power signal distributed to the radiating element coupled thereto in accordance with a phase shift signal supplied thereto. Also included in the transmitting system is a directional finding system for detected the presence of a threat in the coverage region based on radar signals received therefrom, and for determining direction of the detected threat and generating a signal representative of the threat direction. Further included is a means for generating the phase shift signals for governing correspondingly the plurality of phase shifters based on the threat directional signal and the psuedo-random spacings of the radiating elements to render: a single narrow high power beam of jamming radiation from the radiating antenna directed at the detected threat, the high power beam containing only a small portion of the available transmitting power; and simultaneous therewith, effective jamming radiation over the coverage region against other threats which may reside therein.

Preferably, the plurality of radiating elements of the radar jammer transmitting system are sparsely disposed pseudo-randomly over an area surface to form an antenna array, the number of radiating elements being less than the value of the surface area divided by the transmitting carrier wavelength ($\lambda$) squared.

In one embodiment, the directional finding system includes a four feed horn monopulse antenna system for deriving the azimuth and elevation angular directional signals representative of the direction of the detected threat.

DESCRIPTION OF THE PREFERRED EMBODIMENT

Figure 1:
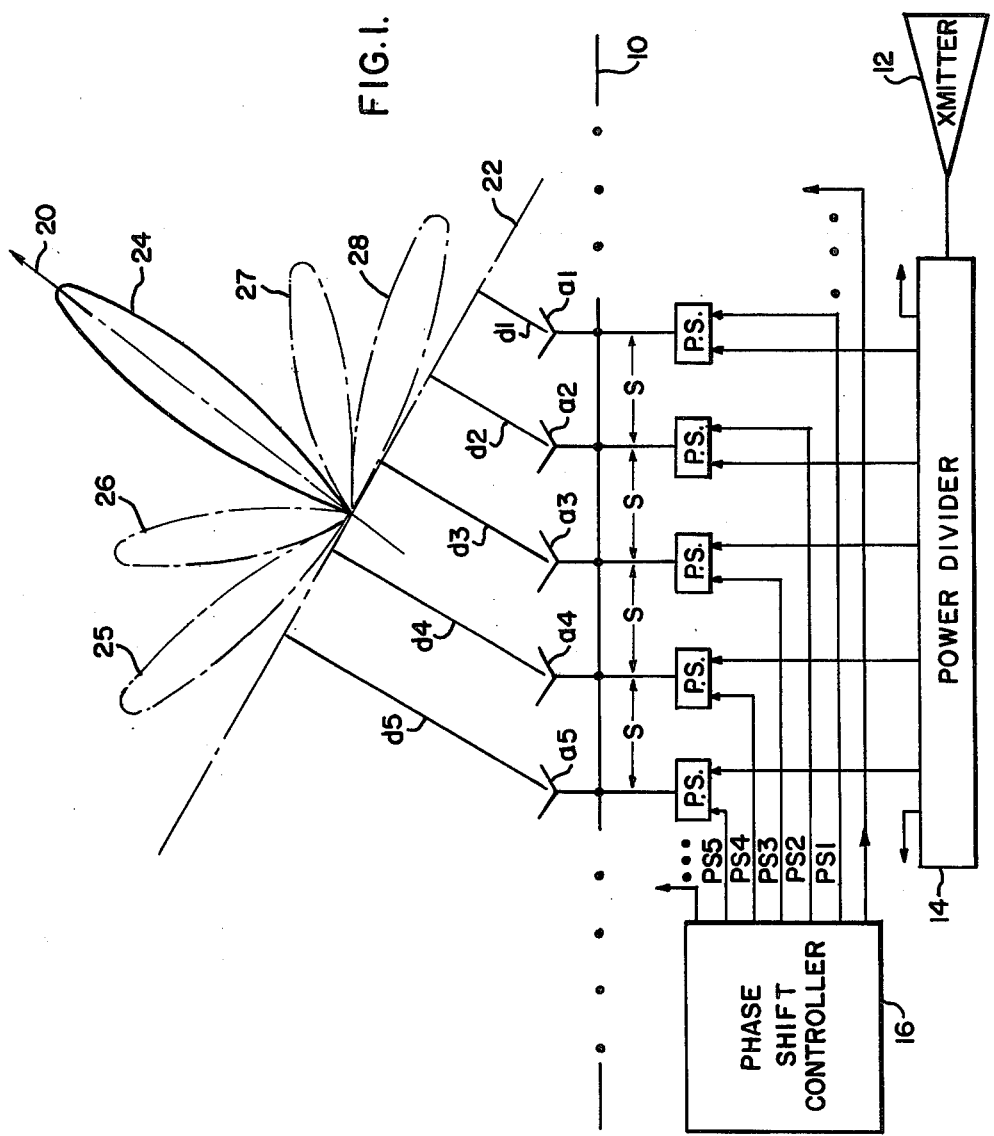
FIG. 1 is a block diagram schematic of a typical embodiment for application as an airborne radar jammer.

The principles of the present invention reside in the desire to utilize for jamming purposes the radiated energy of the spuriously formed beams 25-28 as exemplary illustrated in FIG. 1 and described in the Background section found hereabove. In pursuance of this desire, it was discovered that as the radiating elements are spread over an antenna array area, the spuriously formed beams tended to be spread over the coverage region commensurately therewith. It was further discovered that with random or non-uniform spacing between the radiating elements of the antenna array, spurious type beams may be formed in all directions surrounding the main or desired beam. That is, because of the randomly disposed nature of positional locations of the radiating elements of the antenna array, energy may be formed in many directions, in fact, it is proposed that energy may be provided in an almost even distribution over the threat volume or coverage region. However, the energy distribution will not be ideal in all cases. That is, it is expected that the energy pattern in the threat region may have bumps on the order of 2 to 3 dB average variations, in some cases, with even the possibility of the radiation pattern having some holes. This undesirable situation may be alleviated in the cases of airborne radar jammers because the radar threat may be constantly changing direction with respect to the moving aircraft. Thus, as the aircraft moves relative to the radar threat, the location of holes in the radiation coverage pattern is expected to change and fairly rapidly so that radiation protection or jamming in any one region of threat volume will not be uncovered for any significant length of time.

Of course, the spacing dimensions of the randomly distributed antenna radiating elements are known by definition (pseudo-randomness) and may be kept track of by the phase shift controller, for example, for directing the main beam towards the threat radar. It is only necessary, then, to provide the appropriate phase shift signal to each phase shifter in accordance with the relative spacing of the corresponding radiating element in the array to form and direct the beam. Because of the spread-out nature of the radiating elements, it is proposed that the main beam will be much narrower and require much less energy to defeat the radar threat in the detected direction. As a result, the remaining energy associated with the spuriously produced beam is expected to be spread out over the entire threat volume dispersed more or less everywhere, that is, within statistical constraints.

Figure 3:
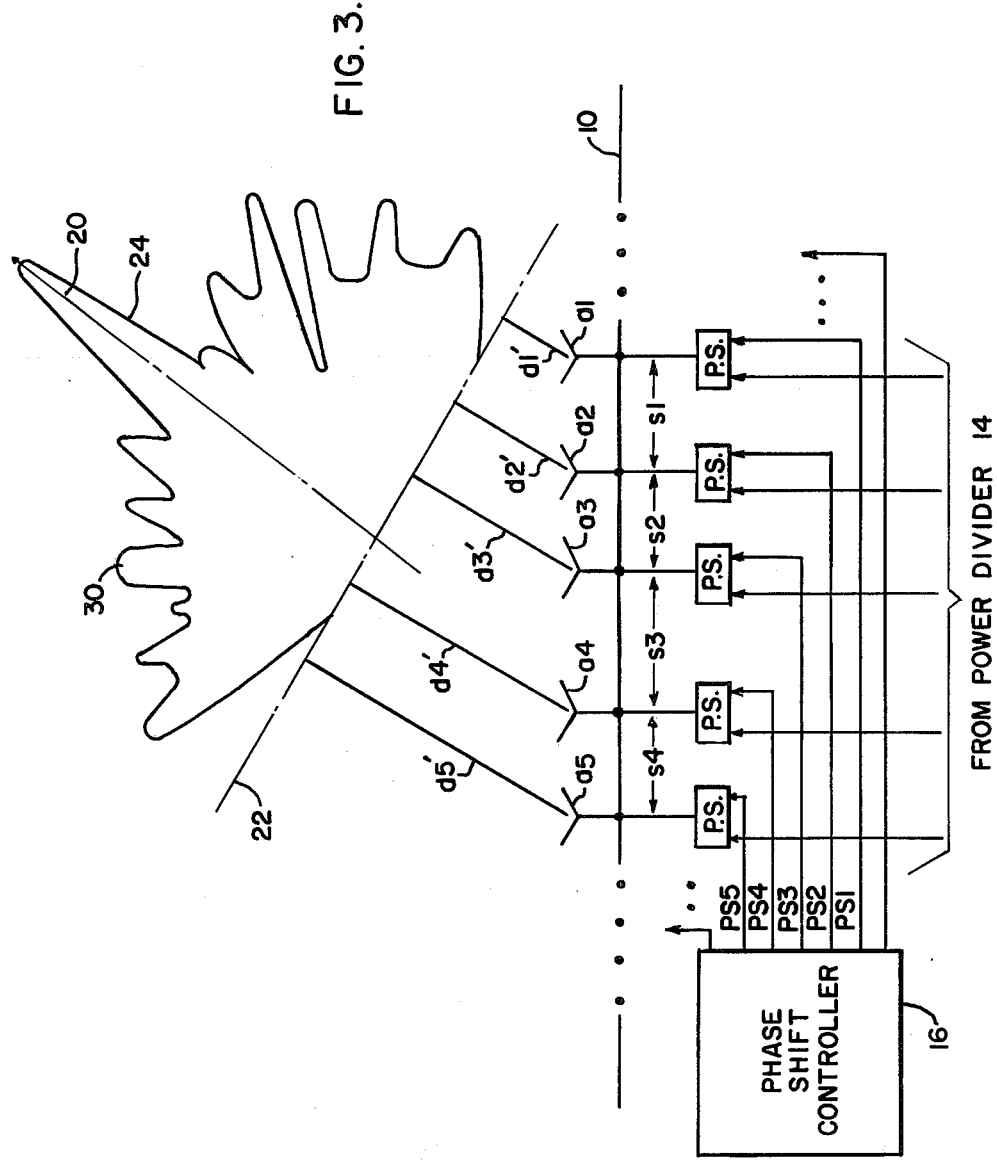
FIG. 3 is a block diagram schematic exemplifying a simplified embodiment suitable for describing the principles of the present invention.

A block diagram schematic exemplifying a simplified embodiment of the principles of the present invention is depicted in FIG. 3. Referring to FIG. 3, the radiation elements a1, a2, ..., a5 of the antenna array 10 are, in the present embodiment, disposed randomly spaced over the area of the antenna array. The spacings between the radiating elements ... a1, a2, a3, a4, a5 ..., namely ... s1, s2, s3 and s4, ... respectively, are random spacings and considered non-uniform. However, these spacings between the radiating elements are known by definition and retained, possibly in a phase shift controller like that shown at 16, for example. To form the main beam 24 in the direction 20 as desired, all that is needed is to supply the phase shift signals PSi to render a new set of delays d1', d2', ... d5' corresponding to the radiating elements a1, a2, ..., a5 to form the desired phase front 22. The pattern of radiated energy 30 illustrated about the main beam 24 results mainly from the randomness in the spacings between the radiating elements of the antenna array.

Figure 2:
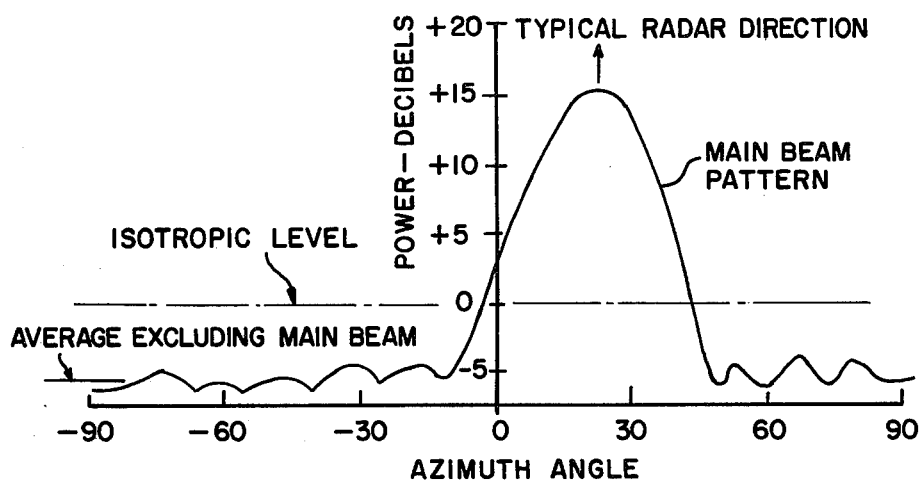
FIG. 2 is a graph which illustrates a typical radiation pattern along the azimuth angle of a radiating antenna having uniformly spaced radiating elements similar to that illustrated by the embodiment depicted in FIG. 1.
Figure 4:
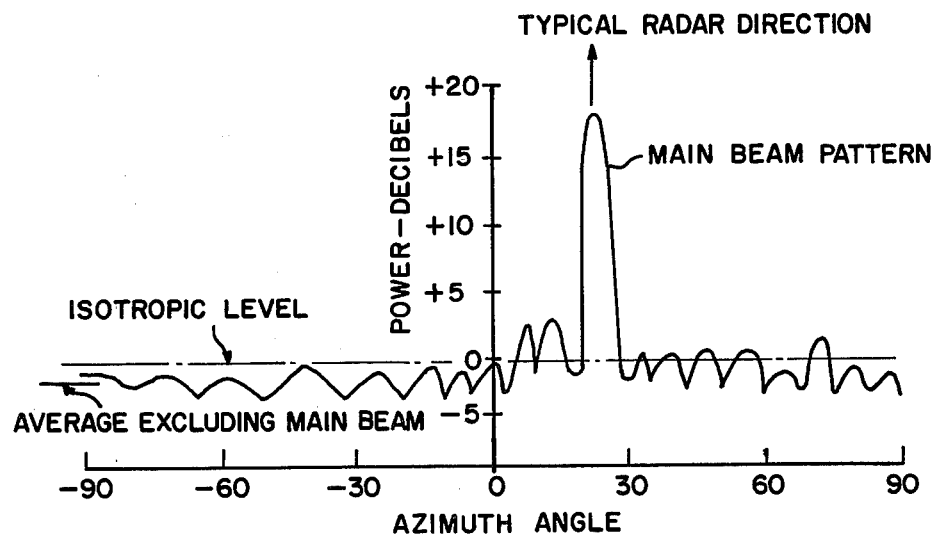
FIG. 4 is a graph which exemplifies a radiation performance pattern rendered by a randomly spaced radiating element array similar to that described in connection with the embodiment of FIG. 3.

An example of a radiation performance pattern rendered by the randomly spaced antenna element array about an azimuth angle is depicted in FIG. 4. The main beam is aimed at about 23° azimuth in a desired direction similar to that depicted in FIG. 2. A comparison between the radiation patterns of FIGS. 4 and 2 reveals that the main beam formed by the randomly spaced antenna element array is much narrower and therefore requires much less energy for accomplishing the same jamming performance and the peak power in the desired direction for both beams appears to be adequate for defeating the radar threat detected. In FIG. 4, it is further revealed that the average radiated coverage of the threat region surrounding the main beam pattern is only reduced on the order of 2 to 3 dB's with respect to the isotropic level of the antenna gain pattern thus, permitting adequate power radiation coverage within the overall threat volume simultaneously with the generation of the narrow radiation beam.

Figure 5:
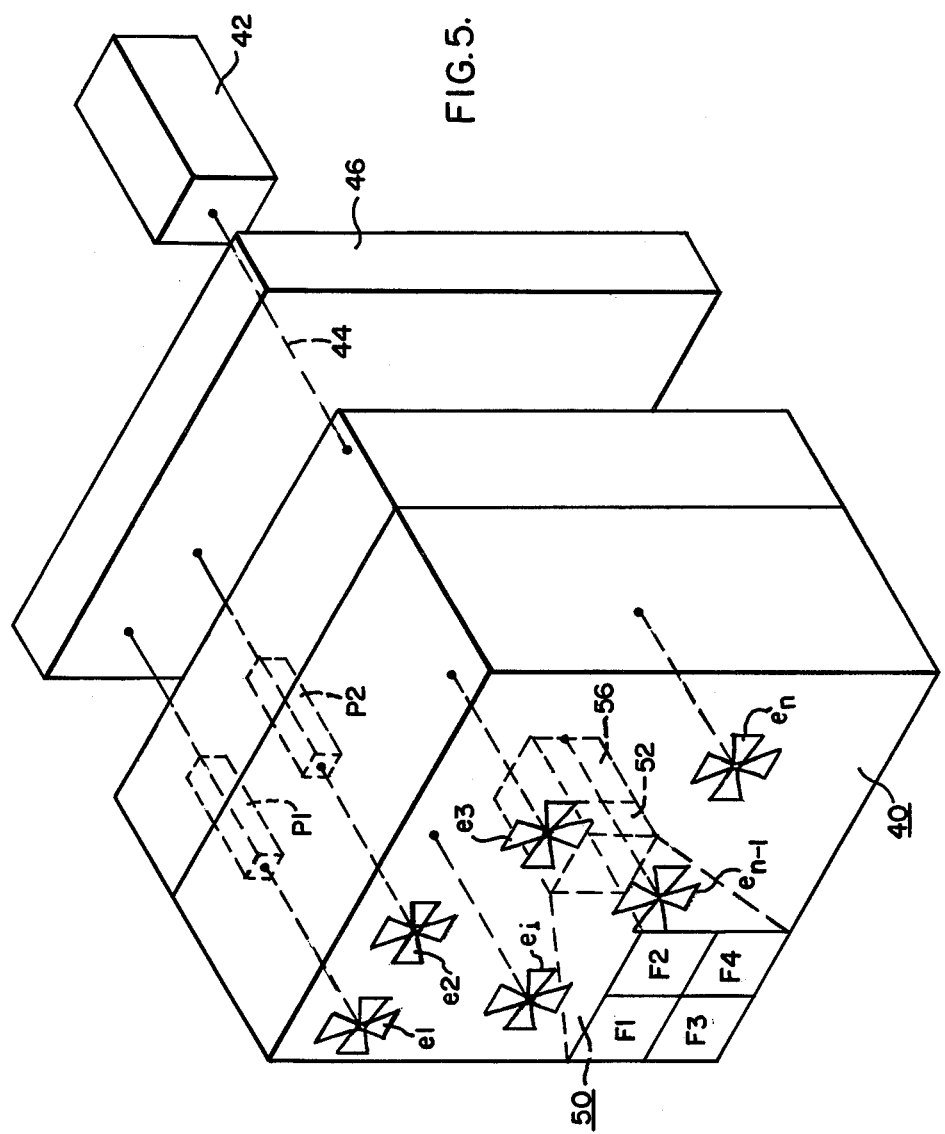
FIG. 5 is an isometric block diagram illustration of a radar jamming apparatus suitable for embodying the present invention.
Figure 6:
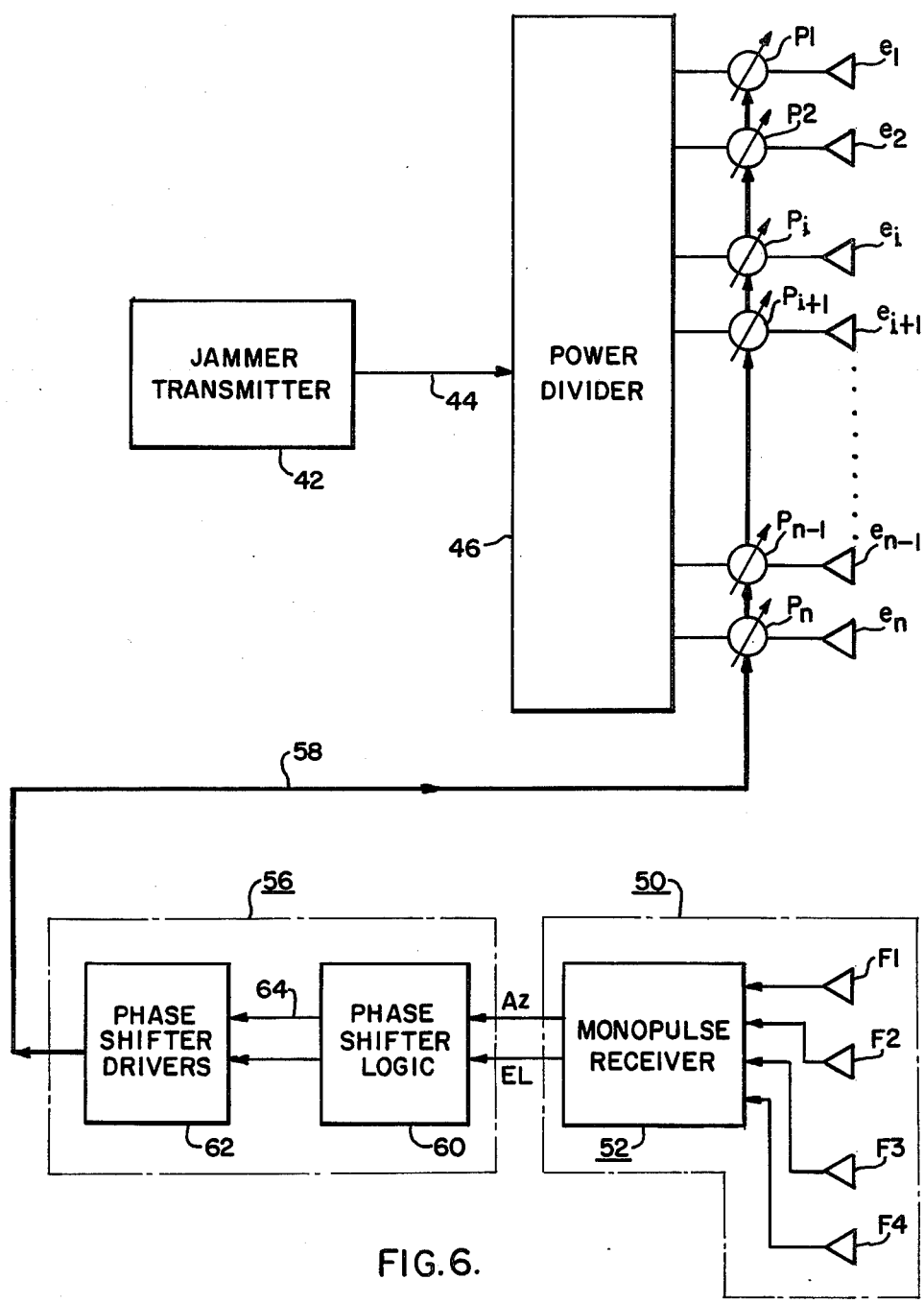
FIG. 6 depicts a functional block diagram schematic of the embodiment of FIG. 5 which is used in the specification in connection with describing the operational aspects thereof.

A more specific description of the present invention will be provided herebelow in accordance with the embodiments depicted in FIGS. 5 and 6. In FIG. 5, there is exhibited an isometric block diagram illustration of radar jamming apparatus suitable for embodying the present invention. In addition, FIG. 6 depicts a functional block diagram schematic of the embodiment of FIG. 5 which will be used herebelow in connection with describing the operational aspects thereof. Referring to FIG. 5, a number of radiating elements e1, e2, e3, ..., $e_i$, ..., $e_{n-1}$, $e_n$ may be disposed on a planar area 40 to form an antenna array. These radiating elements may be positioned pseudo-randomly with respect to one another in the array 40. In the present embodiment, the radiating elements are depicted as crossed-loaded dipoles. It is preferred that the radiating elements be spaced over as wide an area as possible wherein each radiating element $e_i$ is designed to produce a radiating beam which adequately illuminates compositely an angular coverage region which may be typically on the order of 30° elevation by 100° in azimuth, for example. The number N of radiating elements may be chosen to be as large as possible for the planar array constrained only by costs and available mounting locations, weight, ... etc.

For the present invention, each radiating element e1, e2 ... may be phase controlled by a corresponding phase shifter P1, P2, ... as shown by the sketch of FIG. 5. The composite array of radiating elements may thus be phased to produce an absolute maximum with a gain of N times the radiating element gain in a particular direction.

It is preferred that the radiating elements be sparsely located over the planar area 40 such that the number of elements N is less than the area of the planar array A divided by the wavelength ($\lambda$) squared of the carrier frequency of the transmitting signal. Under these conditions, the main beam width formed is very narrow (refer to the graph of FIG. 4) and for this reason, the energy in the main beam is desirably small. Consequently, the main beam will contain only a negligible fraction of the limited available power for transmitting the jamming radiation. Accordingly, the remaining transmitting power may then be distributed almost uniformly over the remaining coverage region as illustrated by the graph of FIG. 4 to render effective jamming radiation for defeating other threats which may reside in the coverage region.

Other elements of the radar jammer transmitting system include a jammer transmitter, depicted by the block 42, which is used for developing a transmitting signal over signal line 44 at a desired carrier frequency from the limited amount of available transmitting power supplied thereto. Further included as a conventional power divider network 46 typically connected for distributing the developed power signal 44 to each of the elements $e_i$ of the radiating antenna 40. The plurality of phase shifters P1, P2, ... which are correspondingly coupled to the plurality of radiating elements e1, e2 ... are each operative, in the present embodiment, to control the phase of the transmitting power signal distributed to the radiating element coupled thereto in accordance with a phase shift signal supplied thereto.

Also included in the radar jamming apparatus may be a directional finding system 50 for detecting the presence of a threat in the coverage region based on radar signals received therefrom. The directional finding system 50 further determines the direction of the detected threat and generates a signal representative of the threat direction. In the present embodiment, the directional finding system 50 includes a four feed horn monopulse antenna system for deriving the azimuth and elevation angular directional signals representative of the direction of the detected threat. Referring to FIGS. 5 and 6, the feed horns F1, F2, F3 and F4 of the monopulse antenna system may be fed into a conventional monopulse receiver 52 which may in turn derive the azimuth Az and elevation E1 angular directional signals representing the direction of the detected threat. For a mre detailed description of a typical monopulse antenna system of the type described in connection with the directional finding system 50 reference is thereby made to the Radar Handbook, ecdited by Merrill I. Skolnik, NRL, McGraw-Hill (1970), particularly Chapter 21, FIG. 15 and the description thereof.

The threat direction signals Az and E1 may be provided to a unit 56 which generates a set of phase shift signals 58 for governing correspondingly the plurality of phase shifters P1, P2, ..., Pn based on the threat directional signals Az and E1 and the pseudo-random spacings of the radiating elements in the planar array 40. The use of the term pseudo-random in the present application refers to a randomness of positions of the radiating elements with respect to one another but with the values of the spacings therebetween known and accordingly retained, like being stored in the generating unit 56, for example, for use in the derivation and generation of the set of phase shift signals 58.

More particularly, a phase shifter logic unit 60 may have the values of the radiating element spacings stored therein and thus as each new set of directional signals Az and E1 are supplied thereto from the monopulse receiver 52, a new set of phase shifter signals 58 may be derived thereby. The generated sets of phase shift signals 58 may be supplied to a corresponding plurality of phase shifter drivers 62 over signal lines 64. The drivers 62 may act as buffer amplifiers for conditioning the phase shift signals 58 compatible with the input circuits of the electronic phase shifters $P_i$. The phase shift signals derived by the phase shifter logic circuit 60 are intended to alter the phase of the power signals of the radiating elements $e_i$ to render a single narrow high power beam of jamming radiation from the radiating antenna directed at the detected threat in the coverage region. However, the high power beam because of its narrowness in width contains only a small portion of the available transmitting power. This leaves ample transmitting power for effective jamming radiation from the antenna array over the coverage region simultaneously with the rendered narrow beam for defeating other threats which may reside in the coverage region.

In describing a typical operation, reference may be made to FIGS. 3, 4 and 6. While the illustration of FIG. 3 is shown for a two dimensional case, it is understood that the sketch may easily be extended to three dimensions without undue complications. In operation, then, the phase shifter logic circuitry 60 may derive phase shifting signals to govern the phase shifters to render an antenna radiating power pattern at an overall isotropic level for a predetermined coverage region in space. As the monopulse antenna system 50 detects a threat in the coverage region, it determines the direction of the detected threat and provides a signal representative thereof to the phase shifter logic circuit 60. In the present example, the azimuth and elevation angular deviations (Az, E1) are used for this purpose. Thereafter, the phase shifter logic circuit 60 derives a new set of phase shifter signals to render a single narrow high power beam of radiation 24 in the direction 20 of the detected threat in the coverage region. This is generally performed by shifting the individual transmitting power signals of the radiating elements to introduce delays therein for producing a wavefront 22 generally perpendicular to the threat direction. Because of the randomness in relative spacings of the radiating elements in the planar array and the sparse population thereof, the effective jamming radiation may continue to be transmitted simultaneously with the single high power beam 24 over the coverage region without a significant loss of power distribution. That is, the high power beam 24 contains only a small portion of the available transmitting power and thus does not significantly detract from the power distribution of the overall coverage region (see FIG. 4).

While the present invention has been described in connection with a particular embodiment such as that shown by the diagrams of FIGS. 5 and 6 especially, it is understood that substitutions, additions or modifications may be made to the elements of the embodiment without deviating from the principles of the present invention. Accordingly, the inventive principles should not be limited to any one embodiment, but rather construed in scope and breadth based on the recitation of the claims heretofollow.

I claim:

1. Radar jamming apparatus having a limited amount of available transmitting power for distribution over a predetermined coverage region for jamming radar threats residing therein, said apparatus comprising:

a radar jammer transmitting system for radiating said predetermined coverage region with said available transmitting power comprising:

a plurality of radiating elements spaced apart pseudo-randomly to form a radiating antenna;

a jammer transmitter for developing a transmitting power signal at a desired carrier frequency from said limited amount of available transmitting power, a power divider network for distributing said developed power signal to each of the elements of said radiating antenna, and a plurality of phase shifters correspondingly coupled to said plurality of radiating elements, each phase shifter being operative to control the phase of the transmitting power signal distributed to the radiating element coupled thereto in accordance with a phase shift signal supplied thereto;

a directional finding system for detecting the presence of a threat in said coverage region based on radar signals received therefrom, and for determining the direction of said detected threat and generating a signal representative of said threat direction; and means for generating said phase shift signals for governing correspondingly said plurality of phase shifters based on said threat directional signal and said pseudo-random spacings of said radiating elements to render:

a single narrow high power beam of jamming radiation from said radiating antenna directed at said detected threat in said coverage region, said high power beam containing only a small portion of said available transmitting power, and simultaneously therewith, effective jamming radiation distributed substantially evenly over said coverage region against other threats which may reside therein.

2. The radar jamming apparatus in accordance with claim 1 wherein the plurality of radiating elements are sparsely disposed pseudo-randomly over an area surface to form an antenna array, said number of radiating elements being less than the value of the surface area divided by the transmitting carrier wavelength ($\lambda$) squared.

3. The radar jamming apparatus in accordance with claim 1 wherein the directional finding system includes a plurality of feed horns in an antenna array coupled to a monopulse receiver for deriving a signal representative of the direction of the detected threat.

4. The radar jamming apparatus in accordance with claim 1 wherein the directional finding system includes a four feed horn monopulse antenna system for deriving the azimuth and elevation angular directional signals representative of the direction of the detected threat.

5. The radar jamming apparatus in accordance with claim 1 wherein the radiating elements are crossed-loaded dipoles.

* * * * *